United States Patent [19]
Williams et al.

[11] Patent Number: 5,678,207
[45] Date of Patent: Oct. 14, 1997

[54] RADIO/MICROPHONE BATTERY CHARGING ASSEMBLY

[75] Inventors: William R. Williams, Coral Springs; Joseph Patino, Pembroke Pines, both of Fla.

[73] Assignee: Motorola, Inc., Schaumburg, Ill.

[21] Appl. No.: 430,921

[22] Filed: Apr. 28, 1995

[51] Int. Cl.⁶ .................................................. H04B 1/034
[52] U.S. Cl. .................... 455/90; 455/89; 455/100; 455/127; 455/343
[58] Field of Search .................. 455/89, 90, 100, 455/343, 348, 349, 351, 127; 379/61, 450; 381/169, 187, 188

[56] References Cited

FOREIGN PATENT DOCUMENTS 94-29966  12/1994  WIPO .................................. 455/89

*Primary Examiner*—Chi H. Pham
*Attorney, Agent, or Firm*—Frank M. Scutch, III

[57] ABSTRACT

A multi-purpose fastening assembly (131) which can be used for both securely fastening and charging an internal battery (113) located within a wireless microphone (103). The fastening assembly (131) includes a head portion (133) and a base plate (135) which are electrically isolated so they can be used as electrical terminals for recharging the battery (113) within the wireless microphone (103).

14 Claims, 4 Drawing Sheets

RADIO/MICROPHONE BATTERY CHARGING ASSEMBLY

TECHNICAL FIELD

This invention relates in general to portable radios and more specifically to fastening assemblies used in battery charging.

BACKGROUND

In today's society, two-way radio communication is now commonly used in almost every aspect of our lives. Both portable and mobile radios are routinely used by law enforcement, commercial business individual personal communications as well as various other entities.

In order to aid in the operation of mobile and portable two way radios, remote microphones are typically used. The remote microphone can either be fastened about a users body in the case of a portable or is directly attached to a mobile radio using a coiled cord and connector assembly. The remote microphone is used to convey a users voice to internal circuitry within the radio.

As many advancements have been made in two-way wireless communication, we are moving into an era where no wires or physical interconnections will be required to connect the microphone to the portable or mobile radio. This concept, better known as a wireless microphone or "mic" will allow the user to communicate with either a portable or mobile radio within a limited distance without the burden of using a wire or coiled cable to provide an interconnection.

Since the wireless mic will not be supplied power through a physical interconnection, it will require its own internal power source. The most likely candidate will be a rechargeable-type battery which will be located internal to the wireless mic. Therefore, a need exists to provide a mechanism to easily recharge the battery within a remote microphone preferable using existing structures commonly used on the microphone to eliminate excess weight and allow the wireless mic to be manufactured at a reduced cost.

DETAILED DESCRIPTION OF THE PREFERRED EMBODIMENT

Figure 1:
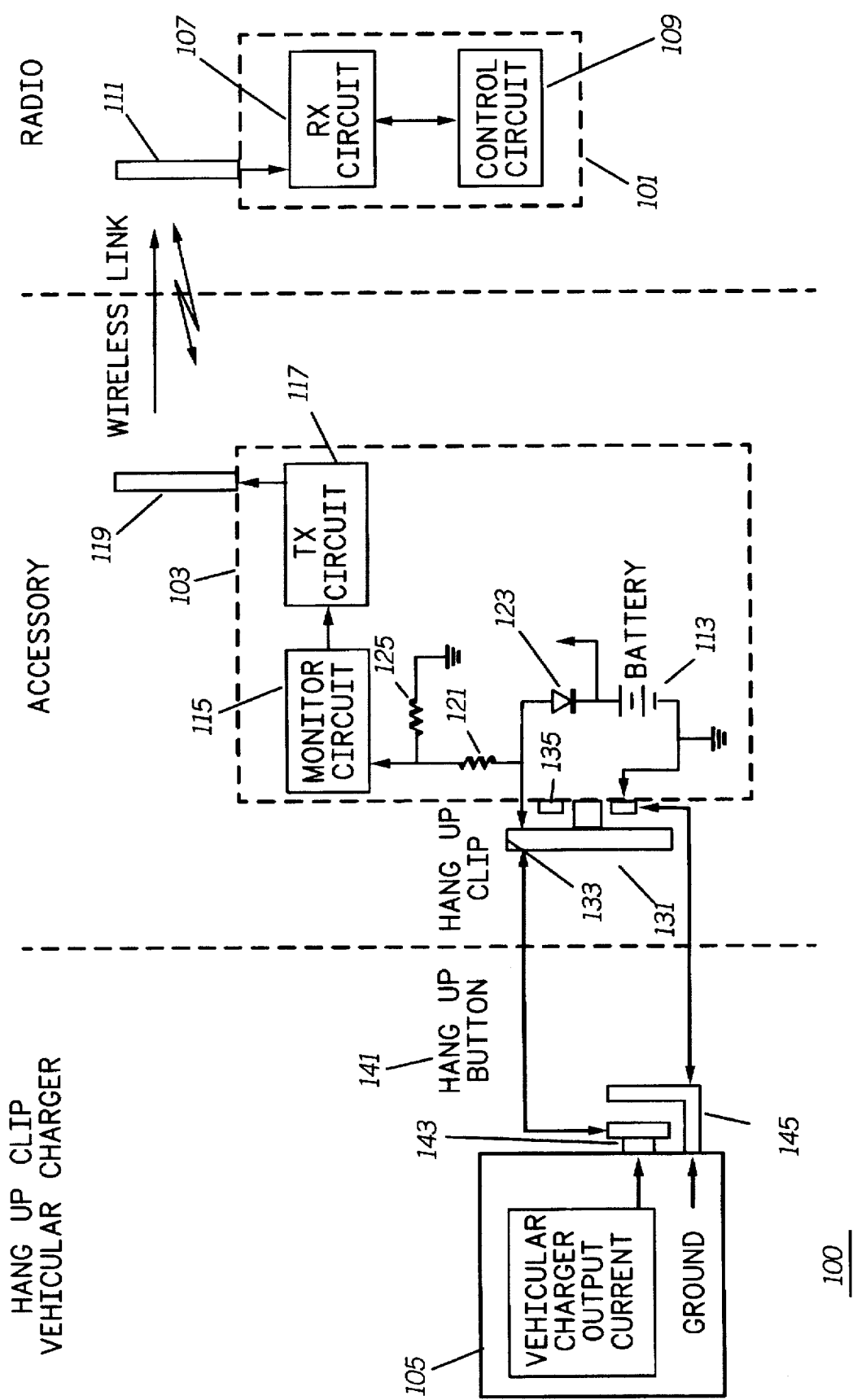
FIG. 1 is a block diagram illustrating the use of a multi-purpose radio fastening assembly according to a preferred embodiment of the invention.

Referring now to FIG. 1, a block diagram illustrating the use of a multi-purpose radio fastening assembly 100 according to a preferred embodiment of the invention is shown. By way of example, the multi-purpose radio fastening assembly 100 is used with a radio 101, wireless microphone 103, and a battery charger 105. The radio 101 may include a portable, mobile or base station two-way radio. In order to accomplish a wireless link between wireless microphone 103 and the radio 101, the radio 101 includes among other things a receive circuit 107 controlled by a control circuit 109. An antenna 111 is shown which receives information from the wireless microphone 103, supplying it to the receive circuit 107. It should be evident to those skilled in the art that the radio 101 includes the typical transmit and receive circuitry for establishing two way communication with other portable or mobile radios or systems.

The wireless microphone 103 is used to provide a wireless link to the radio 101 without the need for a physical cable or interconnection between the microphone and radio 101. The wireless microphone 103 includes at least one rechargeable battery 113 which supplies power to a monitor circuit 115 and a transmitter 117. The transmitter 117 is attached to a antenna 119 which is used to transmit information from the transmitter 117 to radio 101. Included within the wireless microphone 103 a number of components are used to a control a monitor circuit 115. The monitor circuit 115 is used to detect the on or off hook status of wireless microphone 103. This is used ultimately to actuate a feature included with the radio 101 known as private line (PL) and digital private line (DPL). In short, this feature is used to control the squelch actuation of radio 101 when specific analog tones or digital signals or codes are received by the radio 101 which allows the radio 101 to break the squelch allowing it to be used normally. As should be evident by those skilled in the art, the microphone 103 may also include the necessary component circuitry for a speaker enabling it to operate an a wireless speaker/mic in a similar manner as described above.

Attached to the outside surface of the wireless microphone 103 is a fastening clip or fastening assembly 131. Fastening assembly 131 includes a circular disk or head portion 133 having a first diameter and a circular base plate 135 having a diameter greater than the first diameter. The fastening assembly 131 preferably has a circular button shape and is fashioned to mechanically operate to fasten the wireless microphone 103 into a fixed position so it may be easily carried or mounted. In addition to mechanically fastening the wireless microphone 103, the fastening assembly 131 is also used to charge a rechargeable battery 113. This is accomplished by electrically isolating the head portion 133 from the base plate 135 and using these as electrical contracts or terminals along with the battery charger 105.

When radio 101 is a mobile or portable radio, the fastening assembly 131 is used both to charge rechargeable battery 113 and to control the monitor circuit 115 as indicated above. When the fastening assembly 131 is mated with a corresponding hang-up assembly 141, the monitor circuit 115 is pulled high using resistor 121. This causes the wireless microphone 103 to communicate a PL enable signal or code required to operate the radio 101. Also, the diode 123 is forward biased allowing rechargeable battery 113 to be charged by a charging current supplied using the head portion 133 and base plate 135 as electrical contacts. When the fastening assembly 131 is subsequently removed from hang-up assembly 141, resistor 125 pulls the input to the monitor circuit 115 low. This causes the monitor circuit 115 to detect this change where a PL disable signal to be communicated to radio 101. After detection of the PL disable signal the radio 101 again will not break the squelch until the proper PL or DPL is transmitted. Hence, the use of the multi-purpose radio fastening assembly 100 is a multi-purpose device allowing for battery charging, PL enable/ disable capability as well as the mechanical fastening of the wireless microphone 103 to a rigid structure for holding it in a fixed position.

As indicated above, the battery charger 105 includes the hang-up assembly 141. The hang-up assembly 141 includes a body portion 143 and a clamping portion 145. Clamping portion 145 provides a mechanical and electrical connection with base plate 135 which, in the preferred embodiment, is attached to ground. The clamping portion 145 included a forked shaped notch and is electrically isolated and makes no electrical connection with head portion 133. Similarly, the body portion 143 provides a mechanical and electrical connection with head portion 133. As with head portion 133 and the base plate 135, the body portion 143 and clamping portion 145 are electrically separated or isolated using the appropriate hardware. Thereafter, the battery charger 105 may apply the correct charging current utilizing the multi-purpose fastening assembly 100 as electrical charging terminals.

Figure 2:
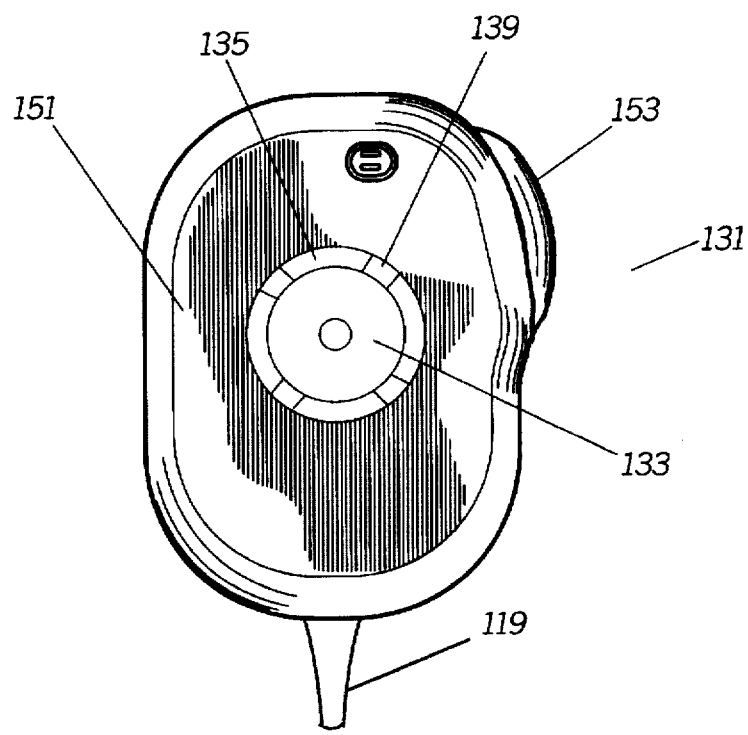
FIG. 2 is a is a plan view of a fastening assembly which can be used to charge a rechargeable battery.
Figure 3:
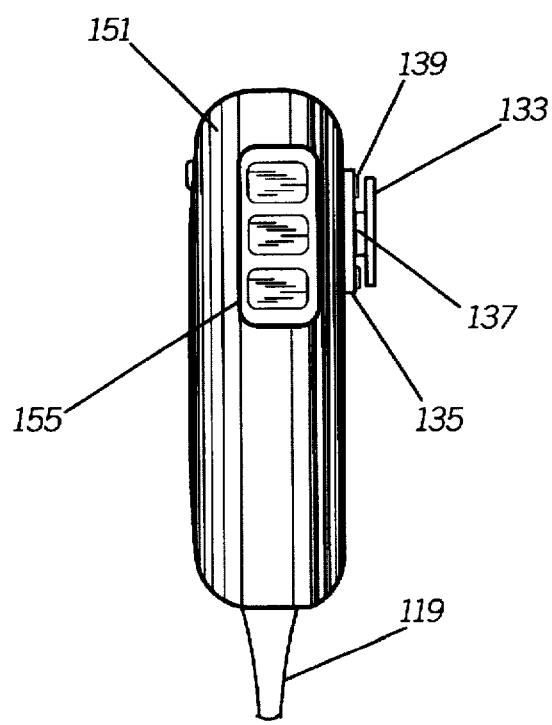
FIG. 3 is a side view of the fastening assembly shown in FIG. 2.

FIGS. 2–3 illustrate a plan view and side view respectively of fastening assembly 131 attached to a housing 151 of wireless microphone 103. As with standard hand-held microphones, the wireless microphone 103 includes a plurality of control features such as a push-to-talk switch 153 and function control switches 155. An antenna 119 extends from the lower portion of the wireless microphone 103 which radiates a radio frequency signal back to the radio 101.

As indicated above, the fastening assembly 131 includes the head portion 133 and base plate 135. In order to electrically isolate the head portion 133 and base plate 135, a non-conductive spacer or washer 137 is used. Through the use of the washer 137, the head portion 133 and base plate 135 can be not only used to mechanically fasten the wireless microphone 103 but can also be used to provide electrical contacts enabling an internal battery to be recharged. Finally, the base plate 135 includes one or more biasing flanges 139 which act to enhance electrical and mechanical contract with a hang-up assembly 141 which is described in detail below. Biasing flanges 139 protrude outward from base plate 135 to provide a biasing force against the body portion 143 of the hang-up assembly 141.

Figure 4:
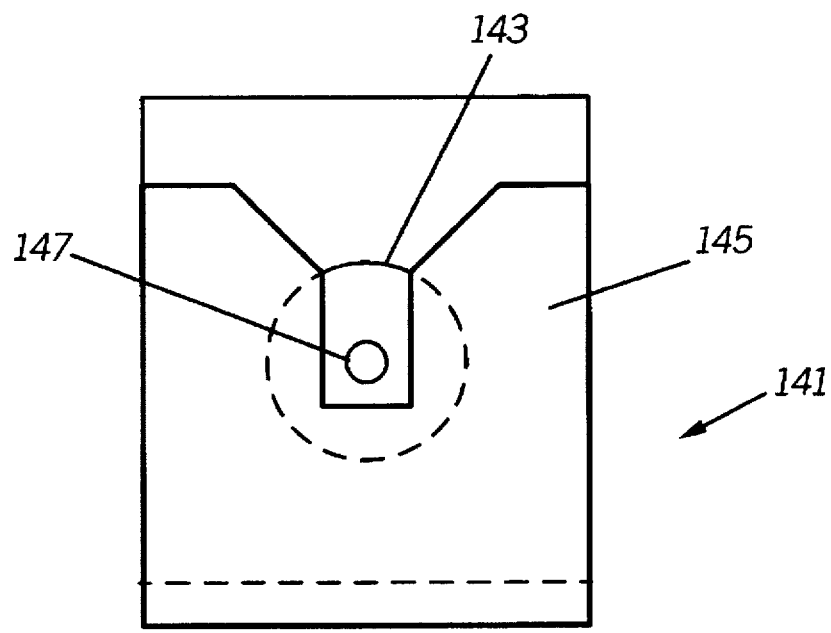
FIG. 4 is a plan view of a attachment assembly used with the fastening assembly used in FIGS. 2 and 3.
Figure 5:
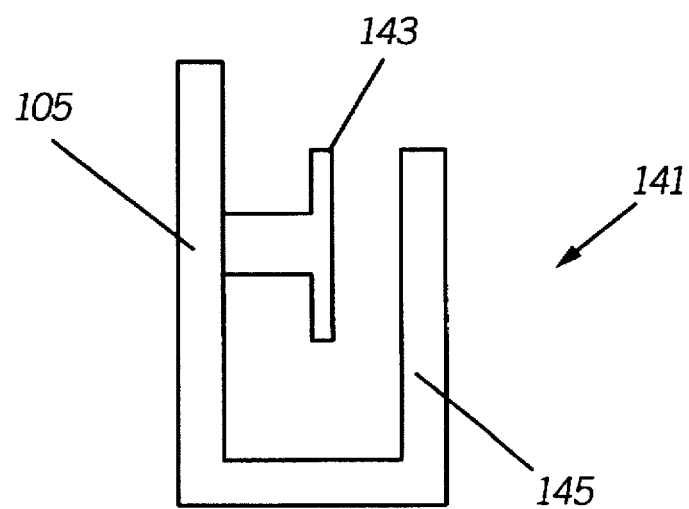
FIG. 5 is a side view of the attachment assembly shown in FIG. 4.
Figure 6:
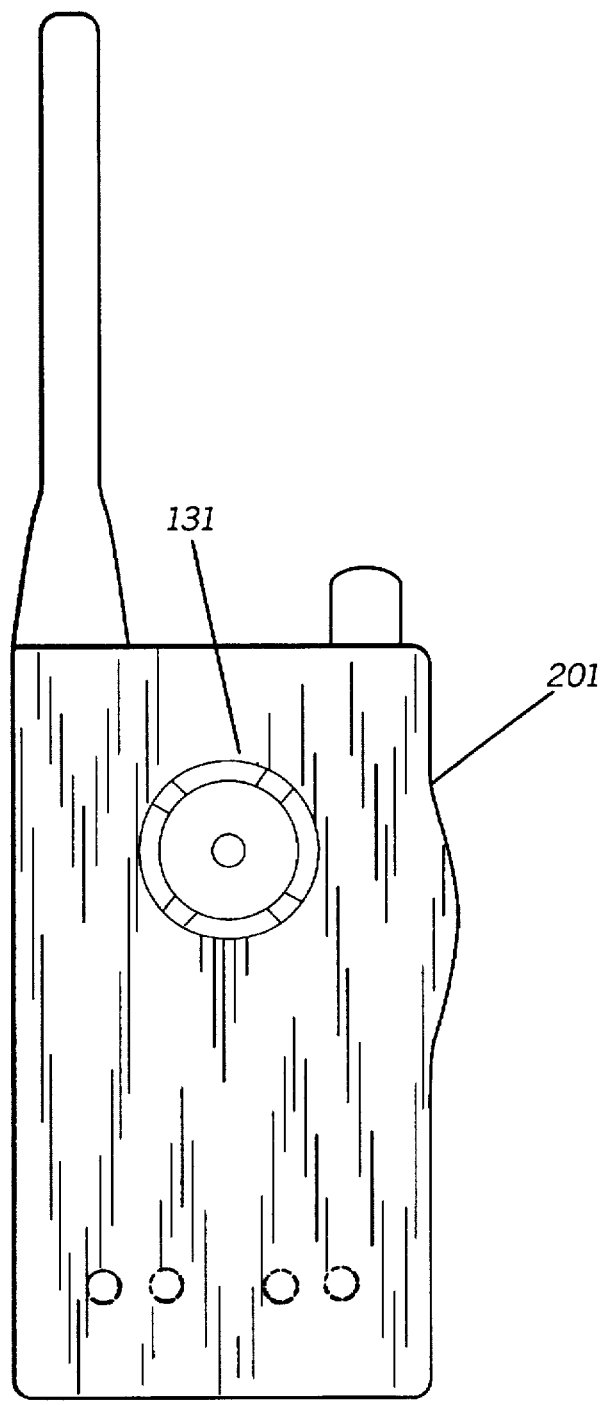
FIG. 6 is a plan view of an alternative embodiment of the fastening assembly used on the rear of a portable radio.
Figure 7:
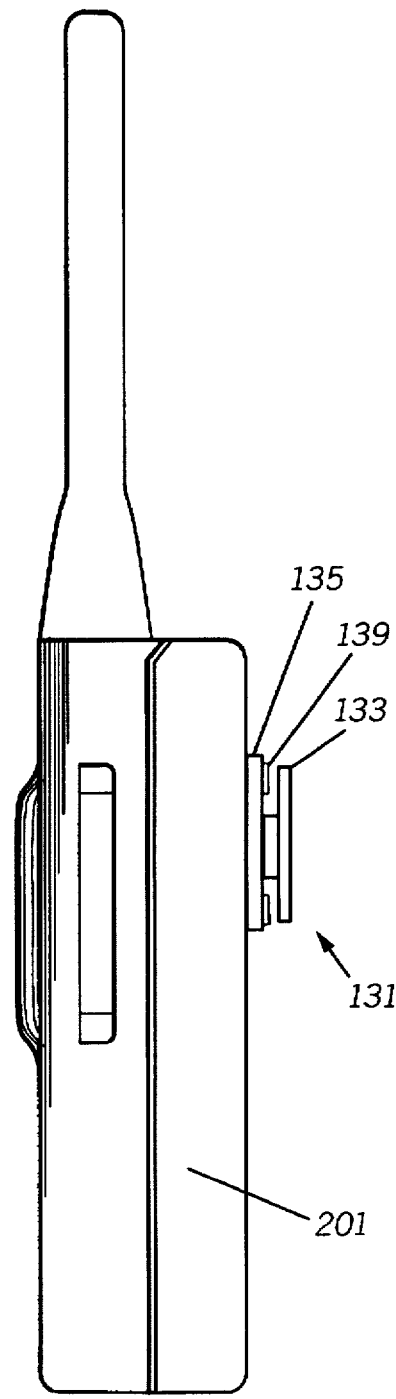
FIG. 7 is a side view of the fastening assembly shown as used in the alternative embodiment of FIG. 6.

FIGS. 4 and 5 show the plan view and side view respectively of hang-up assembly 141. As indicated above, the hang-up assembly 141 includes a body portion 143 and a clamping portion 145. The body portion 143 is generally a circularly shaped cylindrical conductor which protrudes from the housing of the battery charger 105 or the like. The clamping portion 145 is electrically isolated from the body portion 143 and includes a forked notch section which is used to frictionally engage the head portion 133 on the fastening assembly 131. With the biasing force provided by the biasing flange(s) 139, the head portion 133 is held firmly into place making a good mechanical and electrical connection which is essentially for proper recharging of the rechargeable battery 113. As noted above, this allows the rechargeable battery 113 which is attached to fastening assembly 131 to be charged from the battery charger 105 which in turn uses the body portion 143 and clamping portion 145 as charging terminals.

In another embodiment of the invention, the fastening assembly 131 can be used directly with a portable radio 201. In this embodiment, the portable radio 201 typically would be used with a special carrying case, vehicular charger/ adapter assembly or the like. The fastening assembly 131 provides a means to easily recharge internal batteries within the radio 201 without having to remove it from a case or vehicular charger assembly. As noted above, the fasting assembly 131 would not only act to mechanically secure the radio 201 within a vehicular charger would also work as an electrical connector to recharge batteries located with the radio 201. It should be evident to those skilled in the art that fastening assembly 131 has many applications both for battery recharging and for mechanical fastening purposes.

Similarly, the preferred method of utilizing the invention includes a method of charging at least of one rechargeable battery through a microphone attachment assembly having a hang-up assembly connected to a battery charger and a fastening assembly connected to a rechargeable battery used with a radio. The method includes the steps of supplying a charging current to a hang-up assembly used with a microphone, isolated portions the fastening assembly used with the microphone to allow the fastening assembly to be used as an electrical connector; and charging the rechargeable battery through the fastening assembly suing the charging current supplied by the hang-up assembly to the fastening assembly.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A microphone attachment assembly used with a radio microphone comprising:
   a single unitary fastening assembly attached to a rechargeable battery within the microphone;
   a hang-up assembly attached to charging terminals on a battery charger; and
   wherein the single unitary fastening assembly is mated with the hang-up assembly to re-charge the battery only through the single unitary fastening assembly.

2. A microphone attachment assembly as in claim 1 wherein fastening assembly includes a circular disk portion for attaching to the hang-up assembly.

3. A microphone attachment assembly as in claim 2 wherein the hang-up assembly includes a forked notch for frictionally engaging with the circular disk to provide fixed attachment.

4. A microphone attachment assembly as in claim 1 wherein the fastening assembly comprises:
   a head portion mechanically attached to a base plate wherein the head portion is electrically isolated from the base plate to provide an electrical connection for charging the battery.

5. A microphone attachment assembly as in claim 4 wherein the hang-up assembly comprises:
   a body portion attached to a first battery charging terminal for engaging with the head portion of the fastening assembly; and
   a clamping portion attached to a second battery charging terminal for engaging with the base plate of the fastening assembly.

6. A microphone attachment assembly as in claim 1 wherein the connection of the fastening assembly to the hang-up assembly also controls actuation of at least one radio function.

7. A microphone attachment assembly as in claim 6 wherein the at least one radio function is the private line (PL) used for actuating the radio squelch.

8. A multi-purpose fastening clip used with a portable radio for charging at least one battery comprising:
- a first member for connecting to a first charging terminal of a charging device;
- a second member for connecting to a second charging terminal of the charging device;
- an insulator for electrically isolating the first member from the second member; and
- wherein the first member and the second member form a unitary multi-purpose fastening clip used for both fastening the portable radio and charging the at least one battery.

9. A multi-purpose fastening clip as in claim 8 wherein the portable radio is a wireless microphone.

10. A multi-purpose fastening clip as in claim 9 wherein the battery is used to power the wireless microphone.

11. A multi-purpose fastening clip as in claim 8 wherein the first member is substantially circular having a first diameter which protrudes from the second member for attaching to the first charging terminal of the charging device.

12. A multi-purpose fastening clip as in claim 11 wherein second member is substantially circular having a second diameter greater than the first diameter for attaching to the second charging terminal for the charging device.

13. A multi-purpose fastening clip as in claim 12 wherein the second member further comprises at least one clamping portion for providing a biasing force to the fastening clip when secured in the charging device.

14. A method of charging at least one battery through a microphone attachment assembly having a hang-up assembly connected to a battery charger and a unitary fastening assembly connected to at least one battery used with a radio comprising the steps of:
- supplying a charging current to the hang-up assembly;
- isolating portions of the unitary fastening assembly used with the microphone for allowing the unitary fastening assembly to be used as an electrical connector; and
- charging the at least one battery through the unitary fastening assembly using a charging current supplied from the battery charger through the hang-up assembly.

* * * * *